Nov. 28, 1967     P. T. STEUCKE     3,354,566
SLIDE AND TRANSPARENCY VIEWER ATTACHMENT FOR LAMP FIXTURES
Filed Oct. 14, 1965     2 Sheets-Sheet 1

INVENTOR
PAUL T. STEUCKE

BY *R. Hoffman*

ATTORNEY

United States Patent Office 3,354,566
Patented Nov. 28, 1967

3,354,566
SLIDE AND TRANSPARENCY VIEWER ATTACHMENT FOR LAMP FIXTURES
Paul T. Steucke, 347 Arlington St.,
Waukesha, Wis. 53186
Filed Oct. 14, 1965, Ser. No. 496,206
6 Claims. (Cl. 40—106.1)

ABSTRACT OF THE DISCLOSURE

A slide and transparency viewer comprising a transparent viewing panel disposed in adjustable relation to a desk lamp, pivoting out of the way to a position adjacent the lamp face when not in use, and pivoting thru an arc beyond vertical toward the operator when in use to provide a slightly sloping surface for supporting the items to be viewed.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to an apparatus for viewing slides and transparencies.

The selection and arrangement of individual slides, as in writing a draft for an illustrated lecture or a technical report of research results, is facilitated by being able to view many slides at one time. At other times one needs to obtain information from one or more slides, as when revising or correcting information on a slide, or when preparing a composite drawing. The work can be performed more rapidly and with less possibility of error if the slide is conveniently located for ready reference. Currently available viewers provide for multiple slides, but are desk top or floor based units designed solely for this purpose.

An object of the present invention is to provide a slide and transparency viewed which functions in combination with a typical desk lamp.

Another object is to provide a viewer conveniently and efficiently located with respect to the user.

A further object is to provide a viewer which folds out of the way when not in use.

Other objects and a fuller understanding of the invention will be apparent from the following description and claims, taken in conjunction with the accompanying drawings in which:

In general the apparatus comprises a rectangular-shaped translucent panel, framed or unframed, and means for pivotally attaching the panel adjacent the light face of a desk lamp, such as a spring-balanced, suspended fluorescent light desk lamp, the attaching means comprising hinge means for pivoting the panel along one long edge (one side) of the lamp face and means for detachably holding the opposite long edge of the panel to the opposite side of the lamp face when not in use so that when the holding means is disengaged the panel is suspended from the hinge means, means for securing the suspended, disengaged panel in a plane beyond vertical from the attached position, and means for supporting slides and transparencies on the panel.

Figure 1:
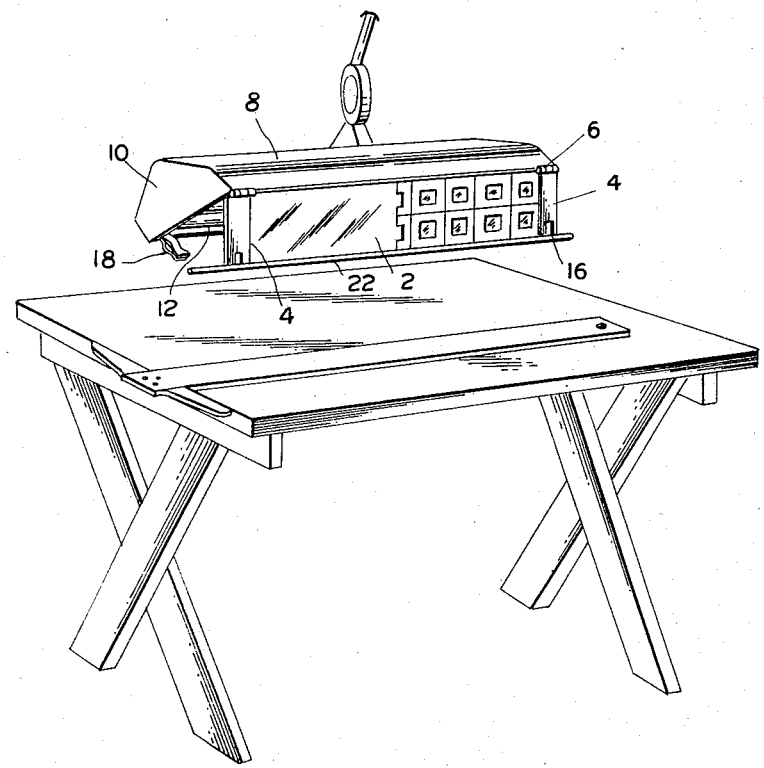
FIG. 1 is a perspective view, with parts broken away, of an embodiment of the apparatus of the present invention as arranged for use.
Figure 2:
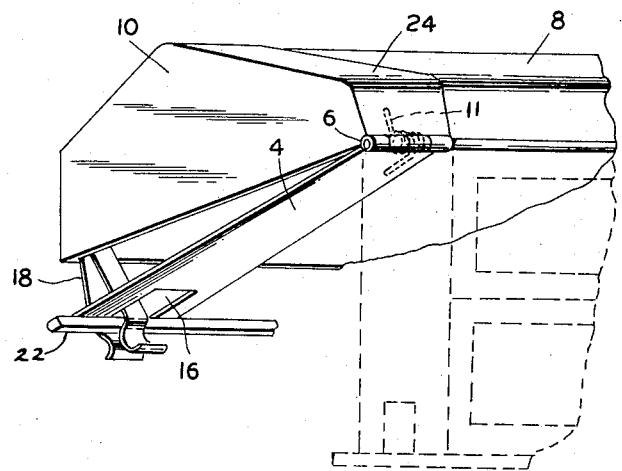
FIG. 2 is a perspective enlarged detail of one end of the apparatus illustrating means for attaching the viewer to a lamp and the means for storing the viewer when not in use.

In the embodiments of the present invention depicted in the accompanying drawings a translucent or transparent panel 2 is attached to the back of the support arms 4 which have hinge means 6 for pivotally suspending the panel in position for use, and for helping attach the panel to the lamp 8. The hinge means 6 can be permanently attached to the lamp, as by welding or riveting, but in the embodiments shown the hinge is part of a unit which can be readily affixed to a typical desk lamp. As illustrated in FIGS. 1 and 2, the hinge means is combined with end cap 10 which, with the panel in open position (dotted line), can be slipped down onto the lamp and provide a firm support. A spring 11 is combined in each hinge to hold the panel open at the desired angle for viewing use. Alternatively, the panel can be stopped at a fixed angle relative to the lamp face 12 by other means, such as a small rod or bar pivoted at one end on the support arm or end cap and adjustably stopped at the other end by friction or notches.

Figure 3:
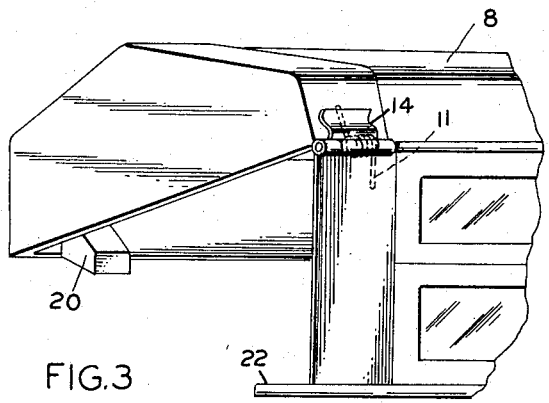
FIG. 3 is a perspective close-up view of one end of the apparatus illustrating an alternate means of attaching the viewer to a lamp.

Another embodiment hinge means is shown in FIG. 3 where a clip 14, adapted to grasp the lamp, is provided.

When not in use, the viewer is pivoted on the hinges to a position adjacent the lamp face and secured by a releasable catch or other holding means. Thus, as shown in FIG. 2, the support arm 4 is provided with an aperture 16 for receiving one arm of a double arm spring clip 18, although a one arm spring catch can be used. Alternatively, a magnetically attracted metal can be used for the support arm, or a portion of such a metal can be suitably attached to the edge of the panel opposite the hinge means, and a magnet 20 (cf. FIG. 3) can be used as the holding means.

The slides are typically supported, as shown in FIG. 1, by an appropriately channeled holding rail 22 secured to support arms 4. By providing a slightly sloped panel surface, as when the holding rail edge of the panel is nearer the operator than the edge near the hinges, the slides in the holding rail 22 will support other slides, eliminating need for a second holding rail, which, if opaque, would cause a shadow when the device is not in use and the panel is adjacent lighted lamp face. It will be obvious, however, that holding rails can be made of transparent material and affixed in parallel across the panel, that the panel can be initially constructed as a single unit with integral channels for holding slides, or other variations.

In a specific embodiment of the apparatus of the present invention a translucent plastic panel, 4" x 18" x ¾", was attached proximate the ends to the back of 1" x 4" metal strap support arms which were adapted at one end to form a hinge with the end cap. The five-sided end cap (4⅛" across base x 1" x 2" x 2" x 1") was fitted with a band 24 extending 1" perpendicularly in one direction from the plane of the end on all sides except the base, and one end of the band was adapted to form the other part of the hinge. A holding rail 20½" in length of ¼" stock was prepared with a channel ⅛" in width and about the same depth running the length of the rail. The rail was attached to the front of the support arms (end opposite the hinge end) with the channel side positioned so as to hold the material to be viewed.

At the rear of the lamp from the operator (the other end of the band from the hinge end) was attached a spring clip which grasped the holding rail when one arm of the spring clip was passed through a ½" square aperture in the support arm (as shown in FIG. 2). The spring clip needs a firm grasp on the movable edge of the panel, because the holding means is also holding against the tension of small coil springs 11 included in the hinges. The coil springs act to force the lower end of the panel, in open position, toward the operator, proving a slightly sloping surface against which the slides rest. If the tension of the spring is sufficient to force the panel through too great an arc, an arresting arm or other stop means can be provided to achieve the desired slope. The panel used provided about four inches from the edge of the lamp to the holding rail, thus supplying room for two rows of 2″ x 2″ mounted 35 mm. slides, as shown in FIG. 1. The bottom row was placed in the channel and the upper row rested on the top of the bottom row.

The panel can be made of transparent material, but the property of translucent material to capture and diffuse light makes it preferable for providing a more uniformly illuminated background.

An optional attachment for use with the viewer can be a magnifying means (not shown) mounted for adjustable positioning between the panel and the operator.

While the working models of the viewer attachment were prepared for addition to existing desk lamps, an embodiment of the viewer of the present invention can be included as an integral part in the design of a desk lamp and manufactured for the use as described.

It will be understood that in apparatus of this nature, modifications and other arrangements may be made without departing from the principles and scope of the invention which is not limited to the embodiments hereinabove described and illustrated by way of example and which is defined by the appended claims.

I claim:
1. A slide and transparency viewer for attachment to a suspended lamp having a rectangular-shaped light face bound by two sides and two ends, said sides having greater length than said ends, comprising a rectangular-shaped light-transmitting panel with sides and ends substantially coextensive with those of the light face, means for pivotally attaching said panel adjacent said light face comprising hinge means along one side of said light face and holding means along the opposite side of said light face so that when said holding means are disengaged the panel is suspended from said hinge means, supporting means on said panel for mounting slides and transparencies for viewing, and resilient means engaging both the panel and a side of the light face for holding the suspended, disengaged panel in a plane beyond vertical from the attached position, whereby said slides and transparencies will rest on a face of said panel.

2. The apparatus of claim 1 in which the light-transmitting panel is a translucent panel.

3. A slide and transparency viewer for attachment to a suspended lamp having a rectangular-shaped light face bound by two sides and two ends, said sides having greater length than said ends, comprising a rectangular-shaped translucent panel with sides and ends substantially coextensive with those of the light face, means for pivotally attaching said panel comprising a removable end cap adapted to engage an end of said lamp, a strap-hinge mounted on one side of said end cap and adapted to support said panel along one side of the light face, a releasable catch along the opposite side of the light face so that when the catch is activated to engage the panel, the panel is adjacent said light face, and when the catch is released the panel is suspended from said end cap, supporting means on said panel for mounting slides and transparencies for viewing, and resilient means engaging both the panel and the end cap for holding the suspended, released panel beyond vertical from the attached position, whereby said slides and transparencies will rest on a face of said panel.

4. The viewer of claim 3 in which the releasable catch is a spring clip.

5. A slide and transparency viewer for attachment to a suspended lamp having a rectangular-shaped light face bound by two sides and two ends, said sides having greater length than said ends, comprising a rectangular-shaped translucent panel with sides and ends substantially coextensive with those of the light face, means for pivotally attaching said panel comprising a removable end cap adapted to engage an end of said lamp, a strap-hinge mounted on one side of said end cap and adapted to support said panel along one side of the light face, magnetic holding means on the opposite side of the light face for engaging the side of the panel opposite the hinge, thereby holding the panel against the light face, the panel when released from said magnetic holding means being suspended from said end cap, supporting means on said panel for mounting slides and transparencies for viewing, and resilient means engaging both the panel and the end cap for holding the suspended, released panel beyond vertical from the engaged position, whereby said slides and transparencies will rest on a face of said panel.

6. A slide and transparency viewer for attachment to a suspended lamp having a rectangular-shaped light face bound by two sides and two ends, said sides having greater length than said ends, comprising a rectangular-shaped translucent panel with sides and ends substantially coextensive with those of the light face, means for pivotally attaching said panel comprising a removable end cap adapted to engage an end of said lamp, a strap-hinge mounted on one side of said end cap and adapted to support said panel along one side of the light face, a spring clip on the opposite side of the light face for engaging the side of the panel opposite the hinge, thereby holding the panel against the light face, the panel when released from said spring clip being suspended from said end cap, and a coil spring mounted on the hinge to bear on both the panel and the end cap for holding the suspended, released panel beyond vertical from the engaged position, whereby said slides and transparencies will rest on a face of said panel.

References Cited
UNITED STATES PATENTS

| | | | |
|---|---|---|---|
| 1,812,919 | 7/1931 | Balder | 40—132 |
| 2,107,738 | 2/1938 | Klaus | 40—106.1 |

EUGENE R. CAPOZIO, *Primary Examiner.*

W. J. CONTRERAS, *Examiner.*